(12) United States Patent
Huang

(10) Patent No.: US 12,005,941 B2
(45) Date of Patent: Jun. 11, 2024

(54) SYSTEM AND METHOD FOR CONTROLLING MOVERS IN AN INDEPENDENT CART SYSTEM DURING HEAVY TRAFFIC

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 133 days.

(21) Appl. No.: 17/730,703

(22) Filed: Apr. 27, 2022

(65) Prior Publication Data

US 2023/0347949 A1    Nov. 2, 2023

(51) Int. Cl.
   *B61L 23/00*    (2006.01)
   *B61L 23/26*    (2006.01)
   *B61L 23/34*    (2006.01)
   *B61L 25/02*    (2006.01)

(52) U.S. Cl.
   CPC ............. *B61L 23/34* (2013.01); *B61L 23/26* (2013.01); *B61L 25/021* (2013.01)

(58) Field of Classification Search
   CPC ........ B61L 23/24; B61L 23/26; B61L 25/021; B61L 25/028; B61L 25/026; G01S 19/49
   See application file for complete search history.

(56) References Cited

U.S. PATENT DOCUMENTS

| | | | |
|---|---|---|---|
| 6,290,188 B1 * | 9/2001 | Bassett | B61L 23/34 246/182 R |
| 7,725,252 B2 * | 5/2010 | Heddebaut | B61L 3/125 701/19 |
| 10,745,040 B2 | 8/2020 | Hannah et al. | |
| 11,290,084 B2 * | 3/2022 | Nielsen | H03H 9/545 |
| 11,418,398 B1 * | 8/2022 | Sullivan | G05B 19/41835 |
| 11,529,981 B2 * | 12/2022 | Fiquet | B61L 15/0027 |

(Continued)

FOREIGN PATENT DOCUMENTS

EP    3650971 A1    5/2020

OTHER PUBLICATIONS

Partial European Search Report and Written Opinion for European Applicaiton No. EP 23169751.7 dated Sep. 19, 2023 (14 pages).

(Continued)

*Primary Examiner* — Phutthiwat Wongwian
*Assistant Examiner* — Sherman D Manley
(74) *Attorney, Agent, or Firm* — Boyle Fredrickson, S.C.

(57) ABSTRACT

A motion control system for an independent cart system provides for an improved system for controlling operation of movers in areas of high traffic. A controller monitors operation of the movers to detect heavy traffic. In heavy traffic, the controller may bring a mover to a stop to avoid collisions. Once a mover is stopped, the segment controller will look at the present location of the mover and determine whether it is at the desired position set in the motion command. If the mover is not at the desired position, the stop was a result of heavy traffic. After detecting heavy traffic, the controller commands the mover to resume travel using a modified motion command. The modified motion command will command the first mover to its desired position but will command the move at a reduced rate or using a reduced response in the controller.

20 Claims, 10 Drawing Sheets

(56) References Cited

U.S. PATENT DOCUMENTS

| | | | |
|---|---|---|---|
| 11,643,120 B2* | 5/2023 | Cooper | G05B 19/4189 |
| | | | 701/19 |
| 2008/0123111 A1* | 5/2008 | Hori | G01B 21/12 |
| | | | 356/620 |
| 2016/0139585 A1* | 5/2016 | Hessenauer | H04L 12/413 |
| | | | 700/275 |
| 2017/0212494 A1* | 7/2017 | Bhatt | G05B 19/19 |
| 2017/0217460 A1* | 8/2017 | Huber | B60L 13/03 |
| 2019/0054942 A1* | 2/2019 | Carlson | B61L 27/70 |
| 2019/0283787 A1* | 9/2019 | Carlson | B61L 25/025 |
| 2019/0337545 A1* | 11/2019 | Carlson | B61L 3/125 |
| 2020/0317235 A1* | 10/2020 | Carlson | B61L 27/20 |
| 2021/0046961 A1* | 2/2021 | Whittemore | B61L 23/06 |
| 2021/0088081 A1* | 3/2021 | Huang | B60L 15/005 |
| 2021/0107537 A1* | 4/2021 | Ross | B61L 25/026 |
| 2022/0234634 A1* | 7/2022 | Beach | B61L 27/20 |
| 2022/0411196 A1* | 12/2022 | Das | B65G 43/00 |
| 2023/0068768 A1* | 3/2023 | Huang | G05B 19/19 |
| 2023/0078911 A1* | 3/2023 | Resnik | G01C 21/3461 |
| | | | 701/533 |

OTHER PUBLICATIONS

Extended European Search Report and Written Opinion for European Application No. EP 23169751.7 dated Nov. 28, 2023 (17 pages).

* cited by examiner

SYSTEM AND METHOD FOR CONTROLLING MOVERS IN AN INDEPENDENT CART SYSTEM DURING HEAVY TRAFFIC

BACKGROUND INFORMATION

The present invention relates to motion control systems and, more specifically, to providing improved quality of motion for the movers during heavy traffic in an independent cart system.

Motion control systems utilizing movers and linear drives in an independent cart system can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may pass or stop at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

During interaction with the actuators positioned along the track, a mover may need to travel at a slower rate of speed than along segments of track at which no interaction occurs. It is also desirable to maintain a constant stream of movers travelling past the actuators in order to maximize throughput in the system. As a result, a queuing location may be established prior to stations at which interaction with the actuators occur. A number of movers are arranged in the queue prior to the stations such that the next mover is ready to enter a station as each prior mover leaves the station. While in a queue, a mover may repeatedly start and stop as it advances through the queue. This starting and stopping is a result of the close proximity between movers and high number of movers present in one location.

During travel along the track, there may similarly be other locations where there are a high number of movers present in one location. For example, a track may include multiple branches. A main branch may provide a feed into two or more side branches where action is taken on a product loaded onto the mover. The side branch along which a mover travels may be selected as a function of the product on the mover. After the necessary action is complete, each mover returns to the main branch. As multiple side branches merge back into a main branch, the number of movers may increase. The increased number of movers along one location and/or a mover attempting to merge from a side branch as another mover travels along the main branch may require movers to slow or stop to avoid collisions. Locations along the track at which the number of movers and the proximity of movers to each other require the movers to slow or stop to avoid collisions are considered areas of high traffic.

While collision avoidance is important along any segment of the track, the likelihood that a controller is required to take action to avoid a collision increases in these areas of high traffic. The controller maintains knowledge of the position of each mover along the track. The controller similarly has knowledge of the speed of travel for each mover and an acceleration or deceleration rate for each mover. Based on the speed of travel and deceleration rate for a mover, the controller may determine a minimum spacing required between a first mover and a second mover immediately in front of the first mover to allow the first mover to stop without colliding with the second mover. When the second mover is required to slow down due, for example, to entering a queue, interacting with an actuator at a station, merging, or to avoid a collision with a third mover located in front of the second mover, the first mover approaches the second mover until it reaches the minimum spacing between movers. If the first mover reaches the minimum spacing allowed and the current motion profile the first mover is following would require the first mover to enter the minimum spacing, the controller commands the first mover to slow down at the deceleration rate to avoid colliding with the second mover. Once the second mover has cleared the track in front of the first mover, the controller commands the first mover to speed up at the acceleration rate to resume travel along the track.

Because motion control systems are typically designed for maximum throughput, the deceleration and acceleration rates for movers are commonly set to the maximum value available at a particular location. Similarly, the velocity at which a mover is commanded to move is the maximum value available at the same location. Thus, when movers are commanded to start and stop for collision avoidance as a result of heavy traffic, the movers are typically stopping and restarting at their maximum rates and attempting to transition between a maximum velocity and zero speed. Further, areas of heavy traffic, such as a queueing location may line up multiple movers, allowing one to advance at a time. Each time a mover advances, the rest of the movers in the queue start and stop. This repeated rapid acceleration and deceleration causes excessive wear on the movers. Repeated rapid acceleration and deceleration may also cause a mover to rock back and forth. The rocking motion causes uneven wear on bearing surfaces, vibration of a load on the mover, and may result in audible noise as the mover contacts rails, drive surfaces or the like during the rocking motion.

Thus, it would be desirable to provide an improved system for controlling operation of movers in areas of high traffic.

BRIEF DESCRIPTION

According to one embodiment of the invention, a system for controlling movers in a linear drive system includes a track, multiple movers operative to travel along the track, and a controller. The controller is operative to detect heavy traffic along the track as a first mover is travelling along the track. The first mover is selected from the movers operative to travel along the track, and the first mover is travelling along the track responsive to a first motion command. The controller is using a first set of controller gains to control operation of the first mover, and the heavy traffic indicates the first mover is unable to complete the first motion command without colliding with a second mover, where the second mover is also selected from the movers operative to travel along the track. The controller is further operative to control operation of the first mover according to either a second motion command or a second set of controller gains responsive to detecting the heavy traffic According to another embodiment of the invention, a method for controlling movers in a linear drive system is disclosed, where the linear drive system includes a track and a plurality of movers operative to travel along the track. A first mover is driven along the track with a controller responsive to a first motion command, and heavy traffic is detected along the track with the controller as the first mover is travelling along the track. The heavy traffic indicates the first mover is unable to complete the first motion command without colliding with a second mover. Responsive to detecting heavy traffic, the first mover is slowed, a second motion command is generated for the first mover, and the first mover is driven responsive to the second motion command.

According to still another embodiment of the invention, a system for controlling movers in a linear drive system includes a track, at least a first mover and a second mover operative to travel along the track, a position feedback system, and a controller. The track is divided into multiple blocks. The position feedback system is configured to generate a first position feedback signal, corresponding to a present location of the first mover, and a second position feedback signal, corresponding to a present location of the second mover. The controller is operative to control operation of the first mover responsive to a first motion command, where the first motion command defines a desired position for the first mover upon completion of the first motion command. The controller sequentially assigns at least one first block to the first mover between the present location and the desired position of the first mover responsive to the first motion command, where each first block is selected from the multiple blocks. The controller identifies at least one second block assigned to the second mover or reserved for movement between the first and second mover, where each second block is also selected from the multiple blocks. The controller detects heavy traffic when the at least one first block to be assigned to the first mover is the same as one of the at least second blocks.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
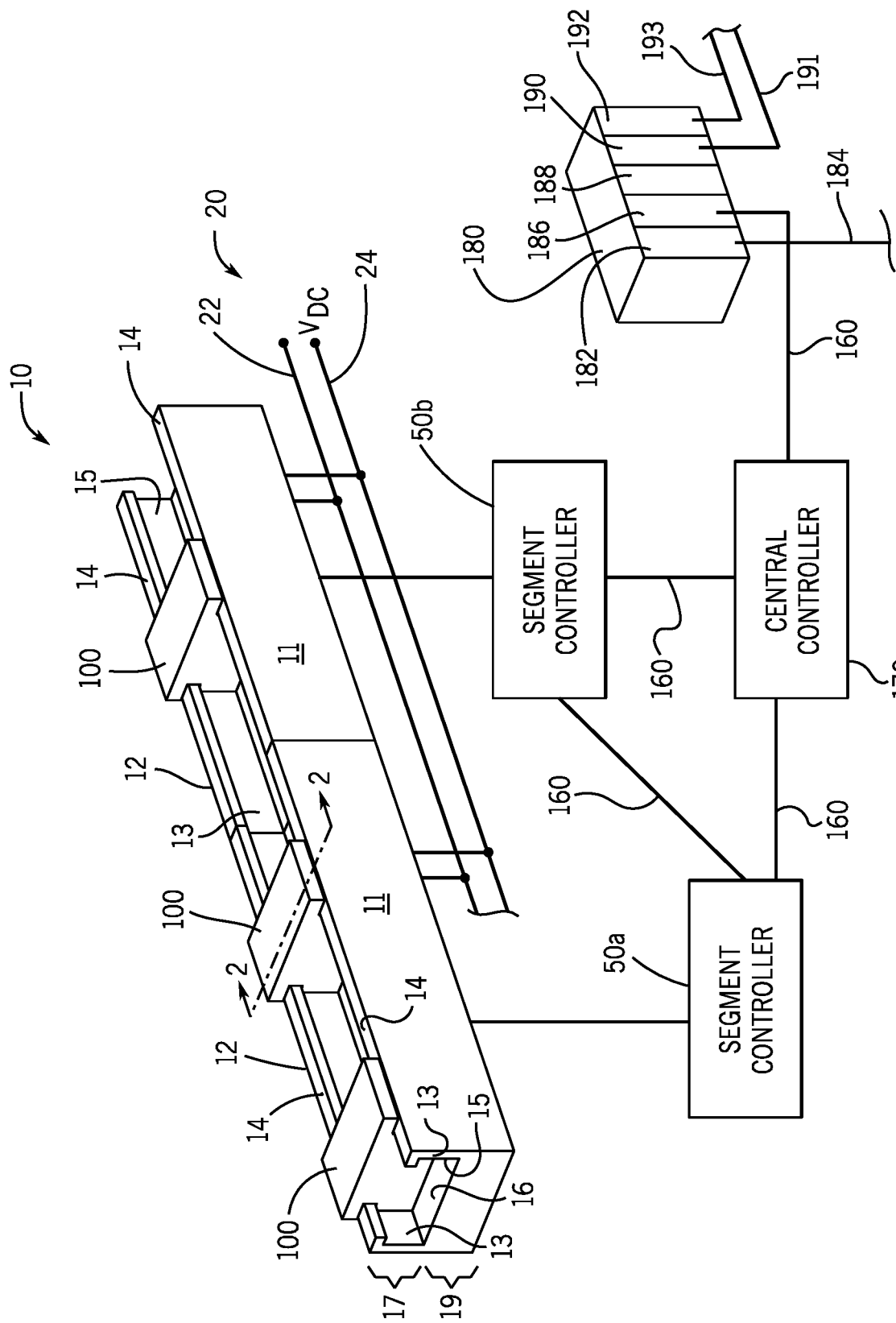
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

According to one embodiment of the invention, an improved system for controlling operation of movers in areas of high traffic includes a segment controller in each segment of track responsible for controlling operation of each mover located along the track segment. The segment controller receives a motion command for each mover and regulates current in coils spaced along the length of the track segment to achieve desired operation of the mover. The segment controller monitors operation of the movers responding to motion commands for heavy traffic. As a mover is travelling along the track, the segment controller will prevent a collision from occurring between the mover and other movers located on the track. A second mover ahead of the first mover may be waiting in a queue, may have experienced a fault condition, or may otherwise be stopped on the track. As the first mover is approaching the second mover, the segment controller will determine a minimum distance required to bring the first mover to a stop. When the first mover is at the minimum distance from the second mover, the segment controller will command the first mover to come to a stop. Once the first mover is stopped, the segment controller will look at the present location of the first mover and determine whether it is at the desired position which was set in the motion command. If the first mover is at the desired position, then the stop was a result of completing the motion command. If, however, the first mover is not at the desired position, the stop was a result of a second mover along the track preventing the first mover from reaching its desired position. The segment controller determines that the first mover is in heavy traffic.

After detecting that the first mover is in heavy traffic, the segment controller will command the first mover to resume travel toward the desired position as soon as the track in front of the first mover has cleared. Because the segment controller has detected heavy traffic, it will generate a modified motion command for the first mover. The modified motion command will still command the first mover to its desired position; however, the modified motion command will command the move at a reduced rate or using a reduced response in the controller. The reduced rate may include a lower velocity, reduced acceleration, or reduced deceleration. Optionally or in addition to the reduced rate, the controller may use reduced controller gains, eliminate feed-forward control paths, limit the amount of current, or thrust, generated by the coils, or perform other similar modifications to the controller to reduce the rate at which the controller responds to the new motion command. The modified motion command causes the mover to travel at less than the maximum performance during areas of high traffic to reduce wear on the mover and the track that may result from frequent and rapid starting and stopping.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel back iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

Figure 3:
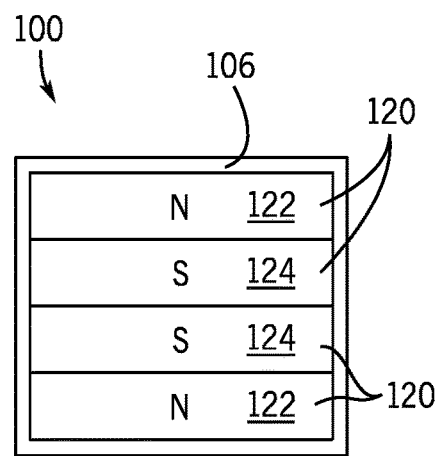
FIG. 3 is a bottom plan view of the exemplary mover of FIG. 2.
Figure 4:
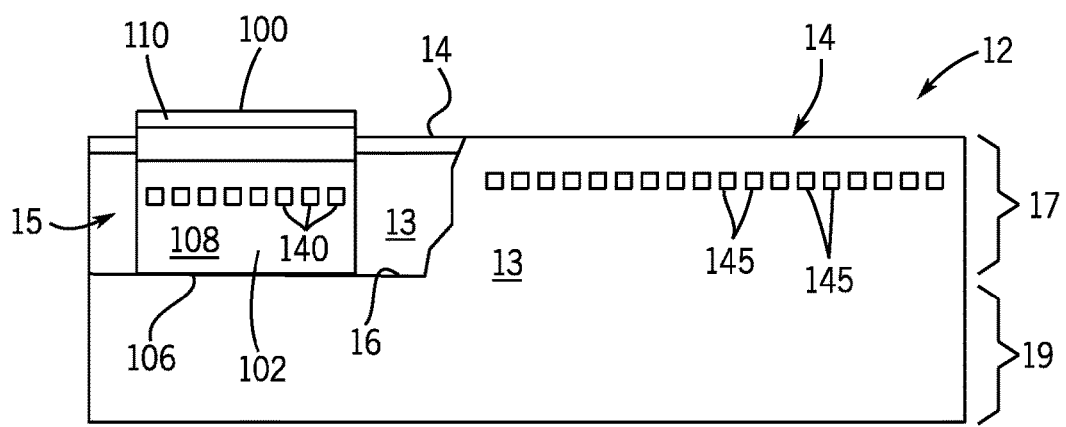
FIG. 4 is a partial side cutaway view of the mover and track segment of FIG. 2.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
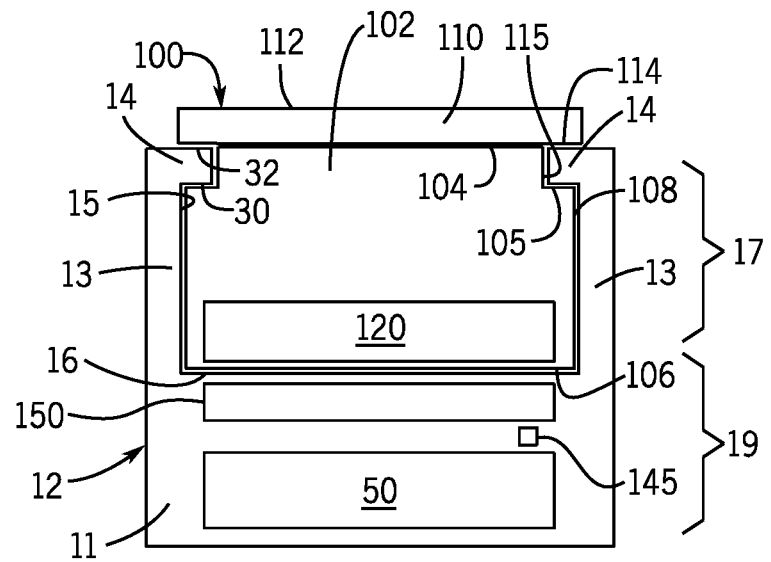
FIG. 5 is a sectional view of another embodiment of a mover and track segment included in the linear drive system taken at 2-2 of FIG. 1.
Figure 7:
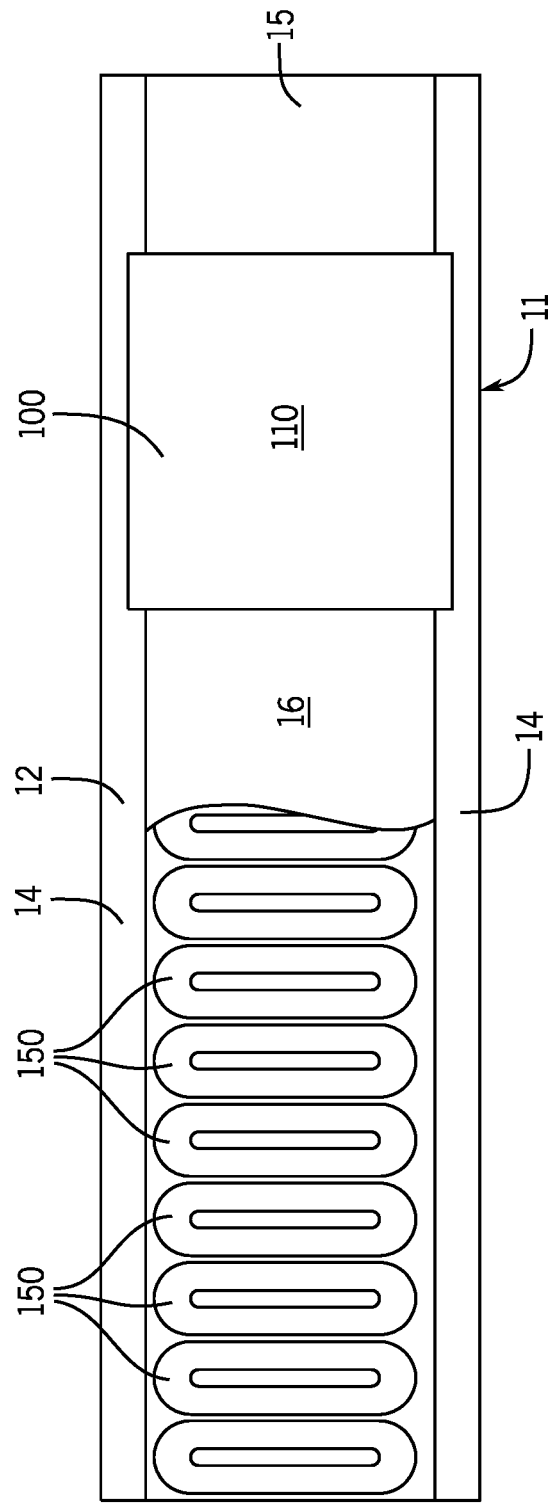
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
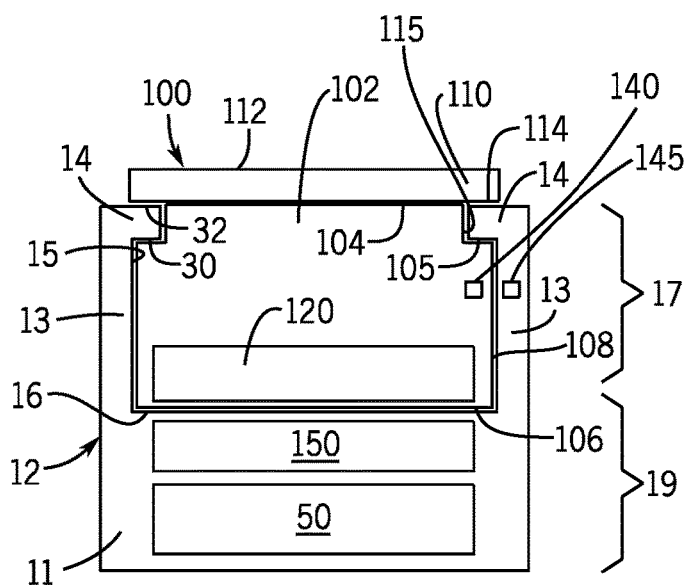
FIG. 2 is a sectional view of one embodiment of a mover and track segment included in the linear drive system taken at 2-2 of FIG. 1.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
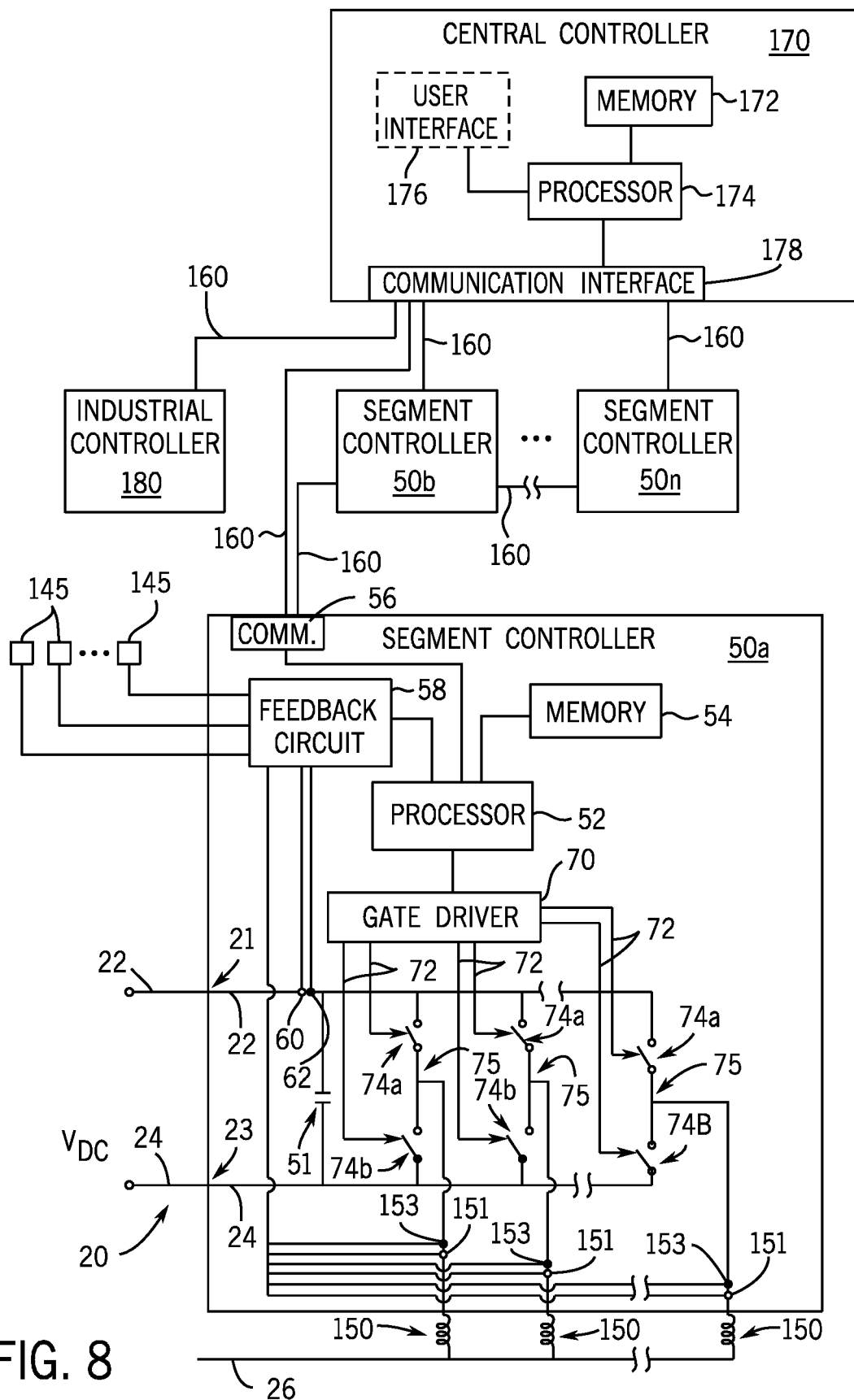
FIG. 8 is a block diagram representation of one embodiment of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
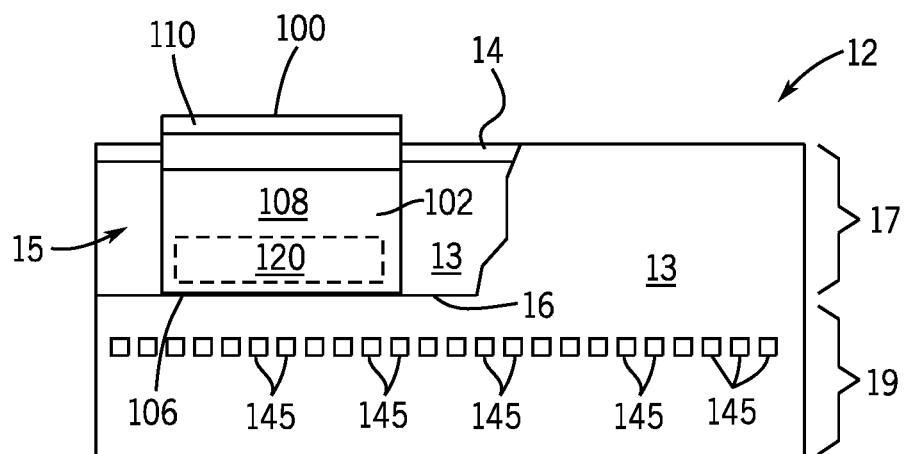
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the embodiment illustrated in FIG. 8, three legs are shown arranged in a half-bridge configuration. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

Figure 9:
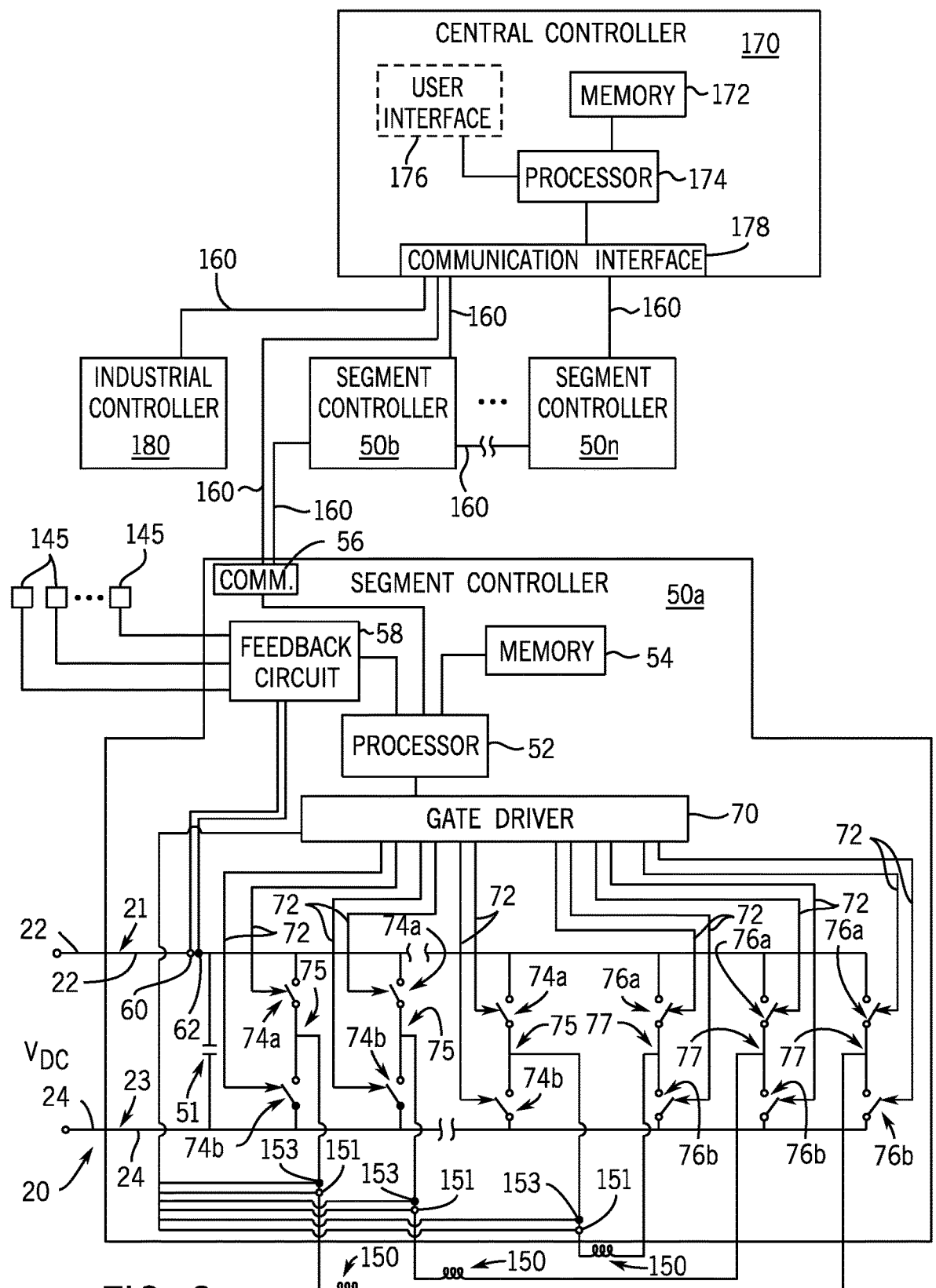
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 150 extending along the track segment 12. Each leg includes a first switching device 74a and a second switching device 74b connected in series on one side of the coil 150. The first and second switching devices 74a, 74b are connected between the positive rail 22 and the negative rail 24 with a first common connection 75 between the first and second switching devices 74a, 74b. The first common connection 75 is connected to the first side of the coil 150. Each leg further includes a third switching device 76a and a fourth switching device 76b connected in series on the other side of the coil 150. The third and fourth switching devices 74a, 74b are connected between the positive rail 22 and the negative rail 24 with a second common connection 77 between the first and second switching devices 74a, 74b. The second common connection 77 is connected to the second side of the coil 150. The first and third switching devices 74a, 76a in each leg may also be referred to herein as upper switches, and the second and fourth switching devices 74b, 76b in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off. Each of switching devices 74, 76 may further include a diode connected in a reverse parallel manner between the first or second common connection 75, 77 and either the positive or negative rail 22, 24.

With reference again to FIG. 8, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. With reference also to FIG. 9, it is contemplated that the feedback signals from the current sensor 151 and/or the voltage sensor 153 corresponding to the operation of the coils 150 may be provided to a dedicated current regulator device. As shown in FIG. 9, the feedback signals are provided directly to the gate driver 70 which would, in turn, regulate the current output to each coil and generate the switching signals 72 accordingly. The energized coils 150 create an electromagnetic field that interacts with the drive magnets 120 on each mover 100 to control motion of the movers 100 along the track segment 12.

Figure 10:
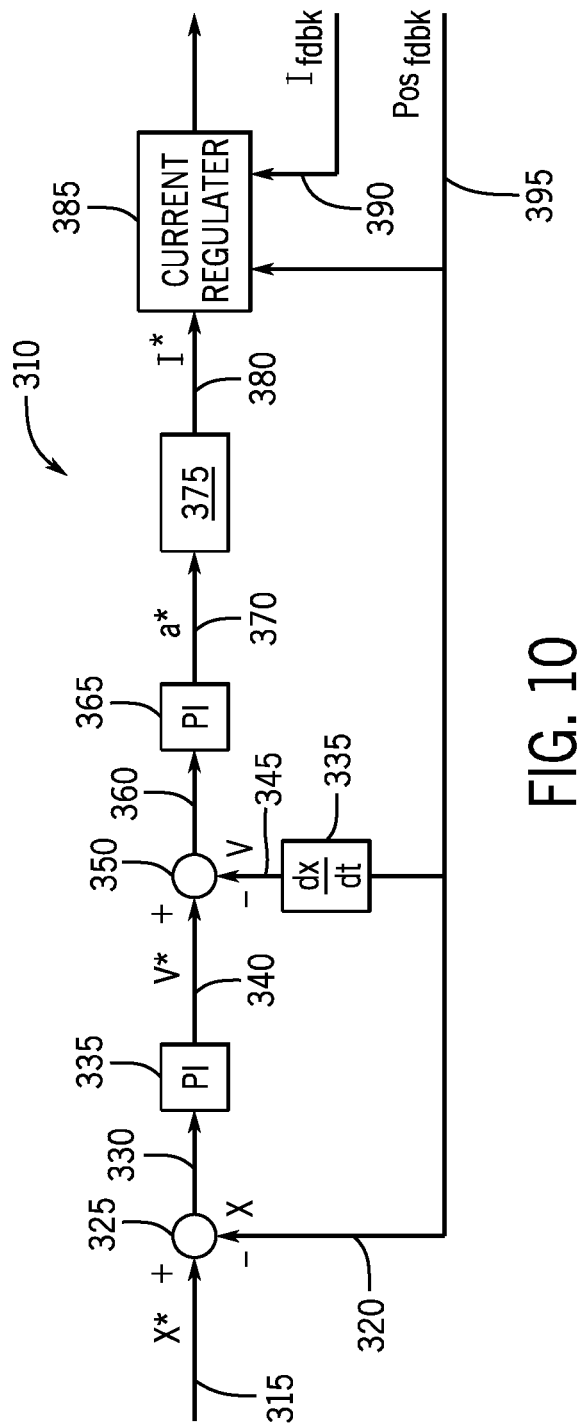
FIG. 10 is an exemplary control module included for execution on a segment controller according to one embodiment of the invention.

In operation, each track segment 12 is configured to control operation of each mover 100 present on the track segment 12. The segment controller 50 receives a command signal corresponding to the desired operation of each mover 100 and controls the current output to each coil 150 to achieve the desired operation. With reference to FIG. 10, one implementation of a control module 310 executable by the segment controller 50 is illustrated. The control module 310 receives a position command signal, x*, 315 as an input. The position command signal, x*, is compared to a position feedback signal, x, 320 at a first summing junction 325. A position error signal 330 is output from the first summing junction 325 and input to a position loop controller 335. According to FIG. 10, the position loop controller 335 includes a proportional and an integral (PI) controller. Optionally, the position loop controller 335 may be just a proportional (P) controller or further include a derivative (D) controller. Each of the proportional (P), integral (I), and/or derivative (D) controllers of the position loop controller 335 includes a controller gain value. The controller gain values are commonly referred to as a proportional gain (Kpp), integral gain (Kpi), and a derivative gain (Kpd). The output of the position loop controller 335 is a velocity reference signal, v*, 340.

The velocity reference signal, v*, 340 is compared to a velocity feedback signal, v, 345 at a second summing junction 350. The velocity feedback signal, v, 345 is generated by a derivative block 355 acting on the position feedback signal 320. A velocity error 360 signal is output from the second summing junction 350 and input to a velocity loop controller 365. According to FIG. 10, the velocity loop controller 365 includes a proportional and an integral (PI) controller. Optionally, the velocity loop controller 365 may be just a proportional (P) controller or further include a derivative (D) controller. Each of the proportional (P), integral (I), and/or derivative (D) controllers of the velocity loop controller 365 includes a controller gain value. The controller gain values are commonly referred to as a proportional gain (Kvp), integral gain (Kvi), and a derivative gain (Kvd). The output of the velocity loop controller 365 is an acceleration reference signal, a*, 370.

The acceleration reference signal 370 is passed through an additional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 50.

The current reference, I*, 380 is, in turn, passed to a current regulator 385, which controls the current supplied to each coil 150 on the track segment. The current regulator 385 receives current feedback signals 390 from the current sensors 305 and position feedback information 395 identifying the measured position of each mover 100 or a compensated position of each mover, as will be discussed in more detail below. Because a mover 100 may span multiple coils 150, the current regulator 385 determines an appropriate current for each coil 150 to produce the force desired to control the mover as indicated by the current reference, I*, 380 and determines a resultant current desired for each coil 150. The current regulator 385 uses the current and position feedback information, 390 and 395, to regulate the current to each coil 150, accordingly.

The output of the current regulator 385 is provided as an input to the gate driver module 70. With reference again to FIGS. 8 and 9, the gate driver module 70 converts the input to a desired output voltage having a variable amplitude and frequency. Having determined the desired output voltage required to produce the commanded input, the gate driver module 70 generates the gating signals 72 according to pulse width modulation (PWM) or by other modulation techniques to control the switching elements 74-77 to produce the desired currents in each coil 150, resulting in the desired motion for each mover 100.

Figure 11:
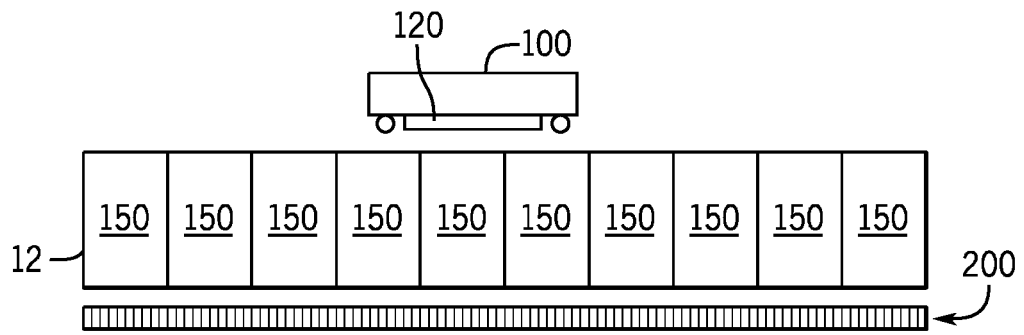
FIG. 11 is block diagram representation of blocks defined along the length of a track segment according to one embodiment of the invention.

According to one aspect of the invention, a block-based motion control system may be provided to improve the quality of motion of movers along the track and to provide improved collision prevention between movers. Turning next to FIG. 11, a track segment 12 includes multiple coils 150 positioned along the length of the track segment 12. A single mover 100 is shown on the track segment 12 for ease of illustration. The drive magnets 120, which interact with the coils 150 to propel the mover 100 along the track are also illustrated. Multiple blocks 200 are shown defined along the length of the track segment 12. Each block 200 has a width that spans a portion of the length of the track segment 12.

Figure 12:
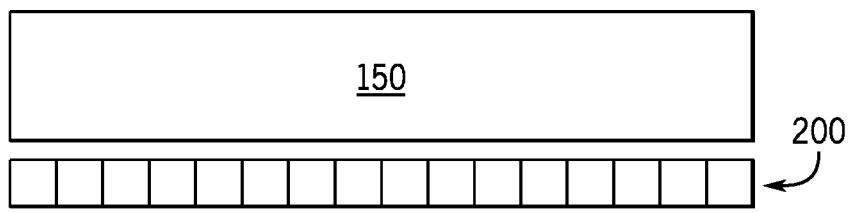
FIG. 12 is a block diagram representation of the blocks of FIG. 11 evenly spaced along the width of one coil of the track segment.
Figure 13:
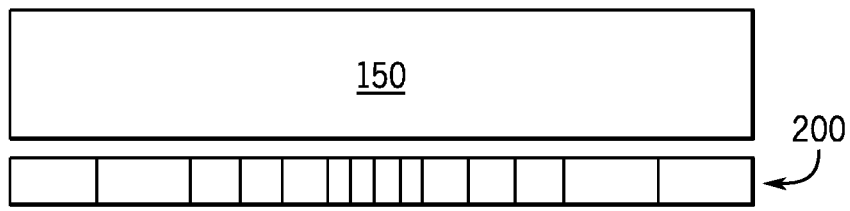
FIG. 13 is a block diagram representation of the blocks of FIG. 11 with variable spacing along the width of one coil of the track segment according to one embodiment of the invention.
Figure 14:
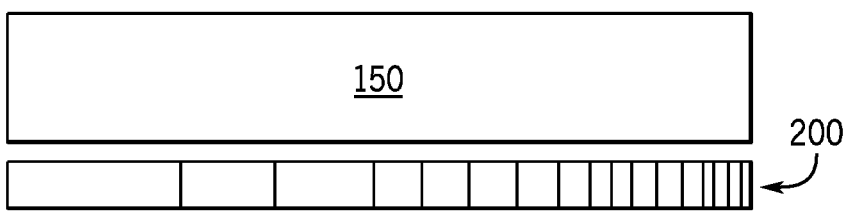
FIG. 14 is a block diagram representation of the blocks of FIG. 11 with variable spacing along the width of one coil of the track segment according to another embodiment of the invention.

According to one embodiment of the invention, the blocks 200 are statically defined. A predefined number of blocks 200 exist along each track segment 12, where each block 200 also has a predefined width. Adjacent movers may be positioned at closer intervals by defining blocks 200 having a smaller width. While a mover 100 may be positioned at any location within a block to which it is assigned, if the width of the block is greater, then, as a mover enters a block, the minimum spacing between the mover entering a block and the next adjacent mover is the width of the block. In other words, adjacent movers 100 may be positioned along smaller finite increments with statically defined blocks 200 when the width of each block is smaller. With reference also to FIG. 12, it is contemplated that each block 200 may have a uniform width and that the spacing along each track segment required for each coil 150 is divided into an equal number of blocks 200. With reference also to FIGS. 13 and 14, it is also contemplated that the blocks 200 may have variable widths along the length of the track segment 12 and/or for each coil 150 along the track segment. In still other embodiments, it is contemplated that a portion of the track segments 12 may have blocks 200 with uniform spacing while other track segments 12 may have blocks 200 with variable spacing. Similarly, the blocks 200 defined for each coil 150 along a track segment 12 may have variable spacing or fixed spacing. According to still another aspect of the invention, each track segment 12 may be defined as a single block, where the discussion of motion control of each mover 100 as defined with respect to blocks would be applicable to track segments 12.

A coil 150 may be energized to drive a single mover 100 at a time. As previously discussed, each segment controller 50 regulates current flow to each coil 150 such that the energized coils 150 create electromagnetic fields that interact with the drive magnets 120 on each mover 100 to control motion of the movers 100 along the track segment 12. The electromagnetic field generally extends across the gap between the coil 150 and the drive magnets 120 mounted to the mover 100 to apply a force to the drive magnets 120 on the mover 100 located proximate each coil 150. To ensure that only one mover 100 at a time is influenced by the electromagnetic field generated by a coil, each block 200 associated with a coil 150 is limited to be assigned to a single set of drive magnets 120 at a time. When the drive magnets 120 span an entire coil 150, such as the middle coil 150 positioned under the drive magnets 120 illustrated in FIG. 11, all blocks 200 associated with the coil 150 may be assigned to a single mover 100. However, as a mover 100 travels along the track segment, a portion of the blocks 200 associated with a coil 150 may be assigned to a mover 100 while another portion, over which the mover 100 has just traveled, may be released and available to be assigned to another mover 100. Assignment of available blocks to a second mover 100 is limited to only portions of the second mover 100 that may extend beyond the drive magnets 120 on the second mover until the portion of the first mover 100 on which drive magnets 120 are mounted travel completely beyond the field generated by the coil 150. In order to maximize throughput on the track, it is desirable to allow an overhanging portion of one mover 100, where the overhanging portion of the mover is that portion of the mover extending beyond the drive magnets 120, to extend over a coil 150 while an adjacent mover 100 is still located over the same coil.

A segment controller 50 assigns each block 200 to one of the movers 100, and only the assigned mover is permitted to travel over each block 200. Each coil 150 may be divided into various block configurations as shown in FIGS. 12-14. For ease of discussion, it will be assumed that the coil 150 is divided into evenly spaced blocks 200 as shown in FIG. 12. As a mover 100 travels beyond each block, those blocks 200 positioned behind the mover 100 are released from the mover 100 and available to be assigned to another mover. However, a mover 100 will only release a number of blocks 200 such that the combined width of the blocks 200 assigned to the trailing mover does not exceed the width of the overhanging portion at the front of the trailing mover while the drive magnets 120 for the leading mover remain over a coil 150. In this manner, a trailing mover cannot be assigned more blocks 200 than will accommodate the overhanging portion, preventing drive magnets 120 from two movers 100 being positioned over one coil 150 in tandem. Once the drive magnets 120 of a mover 100 exit a coil 150, the mover 100 may release blocks 200 up to a sufficient number to accommodate the width 210 of the rear overhanging portion of the mover 100. In this manner, a trailing mover 100 may now be assigned blocks 200 allowing the drive magnets 120 of the trailing mover 100 to enter the next coil, yet the leading mover retains sufficient distance within the coil to accommodate its rear overhanging portion. As the leading mover continues to transition out of the coil 150, successive blocks 200 may be released until it is clear of the coil 150 and no longer has any blocks 200 within the prior coil 150 assigned to it.

Figure 15:
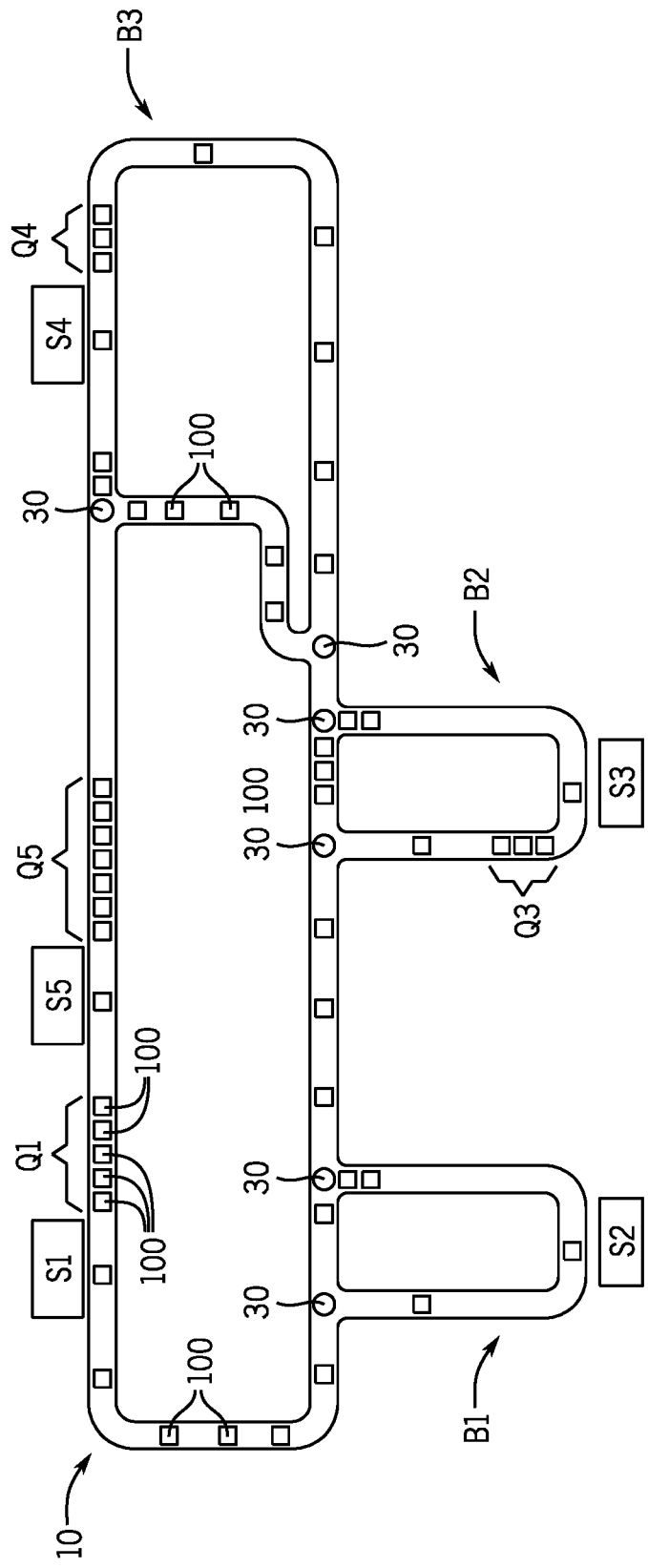
FIG. 15 is a top plan view of an exemplary track layout incorporating one embodiment of the invention.

With reference next to FIG. 15, an exemplary track layout is illustrated. The illustrated track 10 includes five stations. A first station, S1, is a loading station at which a product is loaded onto a mover 100. After being loaded onto the mover 100, different operations may need to be performed on the product. Two branches, B1 and B2, are illustrated. It is contemplated that a mover 100 may travel down the first branch, B1, the second branch, B2, or even down both branches, B1 and B2, depending on the product loaded on the mover 100. Along the first branch, B1, movers 100 pass by a second station, S2, and along the second branch, B2, movers 100 pass by a third station, S3. Each station, S2 and S3, is configured to perform an operation on the product, on packaging associated with the product, or a combination thereof according to application requirements. An optional third branch, B3 is also illustrated. Along the third branch, B3, movers 100 pass by a fourth station, S4. If a mover 100 does not need processing along the third branch, B3, it travels along the bypass branch back to the main branch. A fifth station, S5, is located along the main branch and is an unloading station. The product is removed from each mover 100 at the fifth station, S5, and the mover travels back to the first station to receive the next load. FIG. 15 further shows a first queue, Q1, a third queue, Q3, a fourth queue, Q4, and a fifth queue, Q5. Each queue, Q, corresponds to the respective station, S, the queue precedes. Although not illustrated, a second queue, Q2, could exist if a number of movers 100 begin to arrive at the second station, S2, faster than the second station is able to act on each mover. Further, there may be additional queues located in the system that are not associated with a specific station. For example, an additional, wayside branch may be provided in the track layout to store movers 100 not in use. As additional movers 100 are required to handle processing of product, the movers 100 may be released from the wayside branch, and as existing movers 100 used to perform tasks in the system are no longer needed, they may be routed back to the queue in the wayside branch. The illustrated embodiment is intended to be exemplary only and is not intended to be limiting. It is understood that numerous different track configurations may be implemented according to an application's requirements.

It is desirable for a control program executing in the industrial controller 180 to generate a move command for each mover 100 in the system and then require no further action to have the mover 100 arrive at the desired location. For instance, the leading mover 100 in the first queue, Q1, may be commanded to enter station 1 and receive a product. Each mover 100 may be assigned a number and the control program, therefore, may simply command a specific mover, such as mover 1, to travel to station 1, S1. Once a product is loaded onto mover 1, the control program may then command mover 1 to travel to either station 2, S2, or station 3, S3, depending on a desired action performed by the respective station and required by the product loaded on the mover. The control program continues execution in this "set-and-forget" method to command movers 100 to travel around the track. The central controller 170, the segment controllers 50, or a combination thereof are configured to accept these move commands from the industrial controller 180 and manage operation of each mover 100 in the system to ensure that they arrive at the desired location. For convenience of discussion, it will be assumed that the segment controller 50 is responsible for controlling operation of each mover 100 present on a corresponding track segment 12, and the discussion will be drafted accordingly. It is understood that at least a portion of the steps for detecting heavy traffic, generating new motion commands, and controlling operation of the movers may be performed in the central controller 170 and/or the industrial controller 180 with appropriate communications occurring between the different controllers.

The segment controller 50 uses the motion command to control motion of the mover 100 to arrive at a desired location. The segment controller 50 receives a motion command from the industrial controller 180 which includes the desired location. According to one aspect of the invention, the desired location for a particular mover 100 may be transmitted by itself. According to another aspect of the invention, a motion command may be a data packet including various details for the desired motion. The data packet may include the desired location, a velocity at which to travel, acceleration and deceleration rates to utilize, controller gains, or a combination thereof. It is further contemplated, the data packet may include multiple values for any of the afore-mentioned variables used to control operation of the mover 100 during the move command. The segment controller 50 may select from one of the multiple values according to a location on the track, a payload present on the mover 100, or based on operating conditions along the track, such as detection of heavy traffic. The segment controller 50 controls the current output to the coils 150 to control acceleration of the mover 100 to a desired velocity and monitors the position feedback signal 320 generated by the position sensors 145 to monitor travel of the mover 100 along the track. Based on the desired velocity and deceleration rate for the motion command, the segment controller 50 determines when the mover 100 needs to begin deceleration to arrive at the desired position. When the mover 100 reaches the position at which deceleration is required, the segment controller 50 brings the mover 100 to a stop at the desired location.

In many instances, a motion command requires a mover 100 to travel across multiple track segments 12. Each segment controller 50 is responsible for controlling the mover 100 during the portion of the move command that occurs along the corresponding track segment 12. One, or multiple, segment controllers 50 may control operation of the mover 100 as it accelerates or decelerates. Similarly, one, or multiple, segment controllers 50 may control operation of the mover as it travels at the desired velocity. The central controller 170 may be configured to transmit move commands to each of the segment controllers 50 that will be required to manage a single move for each mover 100. Optionally, the central controller 170 may transmit the motion command to the segment controller 50 on which a mover 100 is located to begin a move command. Each segment controller 50 may transmit the motion command to an adjacent segment controller 50 as the mover 100 transitions between track segments 12.

Throughout a move command, each segment controller 50 monitors the track 10 for the presence of another mover 100 along the track that would prevent a mover 100 from reaching the desired location. As discussed above, each track segment 12 may be divided into blocks 200 and each segment controller 50 may assign blocks 200 to one of the movers 100. The segment controller 50 determines a distance required for the mover 100 to come to a stop based on its present velocity and deceleration and may assign to the mover a number of blocks 200 along the track segment in the direction of travel of the mover 100. As a mover 100 travels along the track segment, the segment controller 50 releases a block 200 that has been travelled over and assigns an additional block 200 to the mover 100 such that it may keep travelling along the track segment. However, as previously discussed, each block 200 may be assigned to just one mover 100. If the next adjacent block 200 to be assigned in the direction of travel is already assigned to another mover 100, the segment controller 50 detects a potential collision and brings the mover 100 to a stop within the number of blocks 200 assigned to a mover 100.

Figure 17:
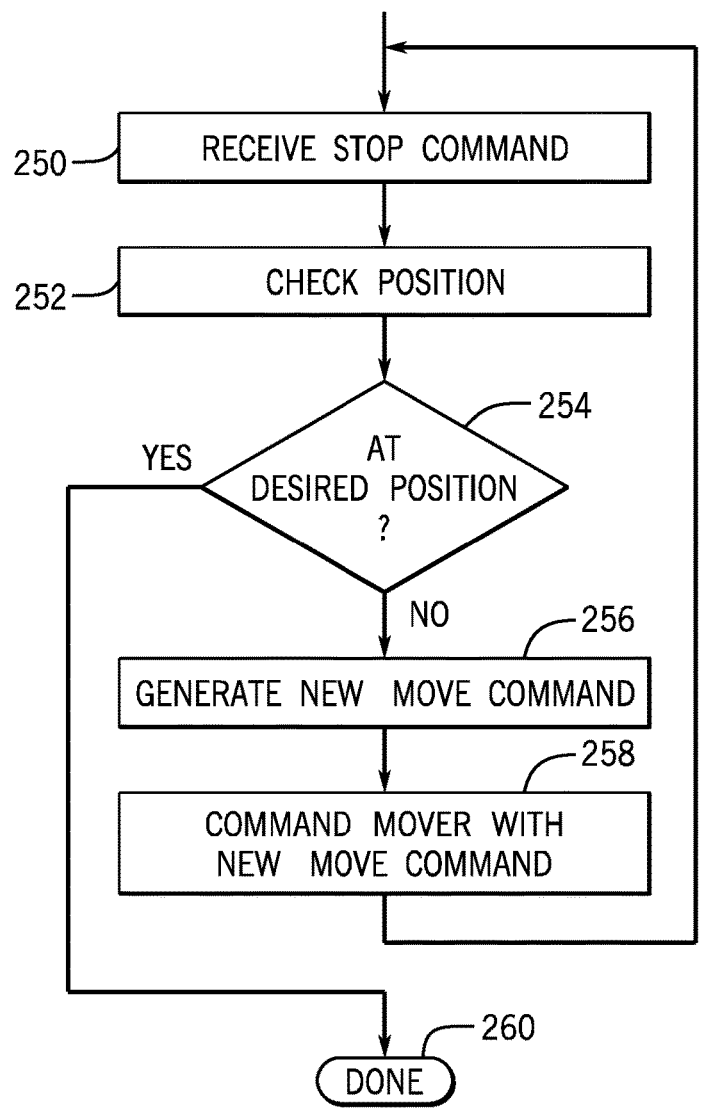
FIG. 17 is a flow diagram illustrating steps for detecting heavy traffic and controlling operation of movers in heavy traffic according to one embodiment of the invention.

When a segment controller 50 must stop a mover 100 prior to reaching the desired location in a motion command, the segment controller 50 determines that heavy traffic is present along the track segment 12. With reference to FIG. 17, the segment controller 50 receives a stop command 250 when a potential collision is detected, as shown in step 250. The stop command 250 may be generated by the segment controller 50, the central controller 170, or industrial controller 180, according to whichever controller is monitoring for the potential collision. At step 252, the segment controller 50 checks the position of the mover 100 after receiving the stop command. According to one aspect of the invention, the segment controller 50 may bring the mover 100 to a complete stop before checking the position of the mover 100. When the mover 100 is stopped, the segment controller reads the present location of the mover from the position feedback system and compares the present location of the mover to the desired location of the mover as included in the motion command and as shown in step 254. If the two locations are the same, then the segment controller 50 brought the mover 100 to a stop according to the motion command. If the two locations are different, the segment controller 50 brought the mover 100 to a stop as a result of heavy traffic along the track segment. According to another aspect of the invention, the segment controller 50 may determine whether the deceleration was a result of the original motion command or a result of detecting heavy traffic before the mover 100 has come to a complete stop. At the start of or any time during deceleration of the mover 100, the segment controller may utilize the present speed and deceleration rate of the mover 100 to determine a projected stopping location for the mover. The segment controller 50 compares the projected stopping location to the desired location in the motion command as shown in step 254. If the two locations are the same, then the segment controller 50 is bringing the mover 100 to a stop according to the motion command. If the two locations are different, the segment controller 50 is bringing the mover 100 to a stop as a result of heavy traffic along the track segment.

Figure 16:
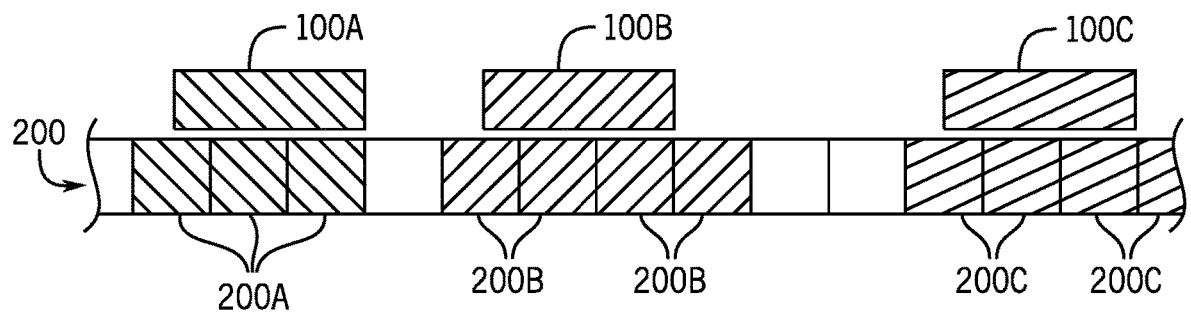
FIG. 16 is a side elevation view of a portion of a track segment, illustrating blocks assigned to multiple movers during heavy traffic.

With reference to FIG. 16, three movers 100 are illustrated in heavy traffic. According to the illustrated embodiment, a one block 200 minimum spacing is required between movers 100. Thus, rather than assigning every block 200 to a mover, there will be at least one block unassigned between adjacent movers. The first mover 100A is shown at a stop. The first mover has three blocks 200A assigned to the mover. As it was travelling, it detected the second mover 100B stopped on the track in front of the direction of travel of the movers 100. Blocks 200 were assigned to the first mover 100A until one block remained unassigned between the first mover 100A and the second mover 100B. The first mover 100A was brought to a stop at the end of the blocks 200A assigned to the first mover. The second mover 100B had previously been brought to a stop as a result of the third mover 100C being stopped along the tracks. However, in FIG. 16, the third mover 100C is again moving and has multiple blocks 200C assigned to the third mover along which it may travel. The second mover 100B has received one new block 200B assigned to the second mover along which it may travel and an additional unassigned block exists between the second mover 100B and the third mover 100C since there are presently two unassigned blocks between the movers. Thus, the additional unassigned block is available to be assigned to the second mover 100B. The second mover 100B may begin travel according to a new move command.

With reference again to FIG. 17, in step 254 the segment controller 50 looks at the location of the mover 100 either when stopped or at a projected stopping location and determines whether the mover 100 is at the desired location from the move command. If the mover 100 is at the desired location, no heavy traffic was detected or heavy traffic had been detected and the segment controller 50 brought the mover 100 to the desired location via subsequent move commands. In either event, when the mover 100 is at the desired location, no additional move commands are required from the segment controller 50. However, if the mover 100 had to stop short of the desired location, then the segment controller 50 will assume responsibility for getting the mover 100 to the desired location by generating additional move commands and controlling operation of the mover 100 according to those mover commands, as shown in steps 256 and 258.

During regions on the track experiencing heavy traffic, each mover 100 must still be directed to reach its desired location. However, it is desirable to modify the initial motion command which is typically configured for maximum throughput to provide for fewer rapid starts and stops at high acceleration and provide for more moderate rates of acceleration, deceleration, and/or velocity of travel of the movers 100 during regions of heavy traffic. The reduced acceleration, deceleration, and/or velocity of travel reduces the overall number of starts and stops of a mover, reduces the wear on the mover 100 and track, and may reduce the audible noise of the system during operation.

As shown in step 256, the segment controller 50 generates a new motion command for a mover 100 which has stopped as a result of heavy traffic. The new motion command includes the desired location for the mover 100. However, the motion profile resulting from the new motion command includes at least one operating parameter that is modified from the original motion command. As discussed above, a motion command may include just a desired location. Alternately, the motion command may include a desired location and various operating parameters for the resulting motion profile, such as acceleration, deceleration, velocity, or controller gains. If the motion command includes just the desired location for a mover 100, the segment controller 50 will have the various operating parameters stored in memory 54 and will generate a motion profile for the mover 100 as a function of the desired location and the stored parameters. It is further contemplated that the segment controller 50 may include multiple sets of operating parameters stored in memory 54. A first set of operating parameters may be utilized to generate the initial motion profile. If heavy traffic is detected, a second set of operating parameters may be utilized to generate a motion profile for the mover 100 in heavy traffic. The second set of parameters may include a reduced velocity at which the mover is to travel or a reduced acceleration and/or deceleration rate. The second set of parameters may also include a revised set of controller gains. With reference to FIG. 10, the controller gains for the position loop controller 335 or the velocity loop controller 365 may be adjusted to reduce the bandwidth of the controller. Reducing the bandwidth makes the controller less responsive to an error between the commanded position and the actual position and, therefore, the first mover 100A, which had to stop due to a second mover 100B located along the track in front of the first mover, will not respond as quickly to the second mover 100B resuming travel and clearing the path for the first mover. If the motion command includes operating parameters, the motion command may include multiple sets of operating parameters. A first set of operating parameters may be included in the data packet for use for generating the initial motion profile. A second set of operating parameters may be included in the data packet for use if a mover 100 encounters heavy traffic. Similar to stored parameters, the operating parameters in the data packet may include velocity settings, acceleration and/or deceleration rates, or controller gains. According to still another aspect of the invention, a hybrid of the two methods may be implemented. The segment controller 50 may store multiple parameter sets in memory 54. The data packet may include identifiers, such as an integral index value, indicating a first set of parameters, a second set of parameters, and so on, where a first identifier defines a first set of parameters to be used for the initial motion command and a second identifier defines a second set of parameters to be used during heavy traffic. The segment controller 50 reads the operating parameters from memory 54 according to the corresponding identifier.

The potential further exists that a mover 100 is unable to achieve a desired location with a second motion command. A series of movers 100 may be located, for example, in one of the queues, Q, illustrated in FIG. 15. The function performed at the corresponding station, S, may take longer to perform than advancing each mover 100 in the queue by one position. Thus, each mover 100 must move forward one spot at a time and come to a complete stop. As illustrated by the arrow returning from step 258 to step 250, after each new move command, the segment controller 50 continues to control operation of the mover 100 by each new move command until a stop command is received. The stop command may be a result of reaching the desired location or of continued heavy traffic. After each stop command is received, the segment controller 50 will check if the present location of the mover 100 matches the desired location sent in the initial move command and reused in subsequent move commands. Until the mover 100 reaches the desired location, the segment controller 50 will continue to generate new move commands using the operating characteristics of heavy traffic operation. Thus, each start and stop occurs during heavy traffic with a reduced profile, providing gentler motion commands for the mover 100 and any load on the mover and providing less wear on the mover 100 and track 10. New move commands continue until, as shown at step 254, the segment controller 50 detects that the mover 100 is at the desired location and jumps down to step 260 completing the desired move. In this manner, the control program in the industrial controller 180 generates a single motion command and need not monitor operation of the mover 100 until the mover 100 has reached the desired location.

As previously discussed, each new motion command generates a motion profile which is less aggressive than the initial motion profile. The new motion command may utilize a reduced velocity, reduced acceleration or deceleration, or controller gains having a reduced bandwidth. It is also contemplated that still other methods if making the new motion profile less aggressive than the initial motion profile may be utilized. According to one aspect of the invention, a feedforward path (not shown) may be utilized in the control module 310. A feedforward path provides a degree of prediction to a control loop which allows the control loop to "anticipate" a response and output current in anticipation of a response rather than waiting for the feedback path to indicate the response occurred. The feedforward path, by its nature, provides a more aggressive control module 310 than that illustrated in FIG. 10. It is contemplated that the feedforward path may be enabled for an initial motion command and disabled for each new motion command generated in response to heavy traffic being detected. According to still another embodiment of the invention, the current regulator 385 is operative to generate current for the linear drive system. The amplitude and phase of current supplied to each coil 150 generates the electromagnetic field which provides thrust to interact with the drive magnets 120 on each mover 100 and to propel the mover along the track. It is contemplated that a first maximum value of current may be permitted during operation of the mover 100 in response to the initial motion command and a reduced maximum value of current may be implemented during operation of each new motion command. The reduced maximum value of current in each coil reduces the allowed thrust generated by each track segment to drive a mover 100 along the track.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for controlling movers in a linear drive system, comprising:
   a track;
   a plurality of movers operative to travel along the track;
   a position feedback system configured to generate a position feedback signal for each of the plurality of movers; and
   a controller operative to:
      control operation of a first mover, selected from the plurality of movers, along the track responsive to a first motion command, wherein the controller is using a first set of controller gains to control operation of the first mover and wherein the first motion command includes a desired position,
      detect heavy traffic along the track as the first mover is travelling along the track, wherein the heavy traffic is detected when the first motion command is interrupted and the mover is commanded to stop at a position other than the desired position; and
      control operation of the first mover according to either a second motion command or a second set of controller gains responsive to detecting the heavy traffic to resume travel to the desired position.

2. The system of claim 1,
   wherein the controller is operative to detect the heavy traffic by:
      detecting when the first mover has stopped after travelling along the track responsive to the first motion command,
      comparing a present location of the first mover to the desired position of the first mover in response to the first motion command, and
      detecting the heavy traffic when the present location of the first mover is not the desired position of the first mover.

3. The system of claim 1, further comprising:
   wherein the controller is operative to detect the heavy traffic by:
      detecting when the first mover is slowing after travelling along the track responsive to the first motion command,
      determining a projected stopping location for the first mover as a function of a velocity and of a deceleration rate of the first mover,
      comparing the projected stopping location of the first mover to the desired position of the first mover in response to the first motion command, and
      detecting the heavy traffic when the projected stopping location of the first mover is not the desired position of the first mover.

4. The system of claim 1, wherein the controller is further operative to:
   generate the second motion command for the first mover responsive to detecting the heavy traffic, and
   commanding the first mover to travel along the track responsive to the second motion command.

5. The system of claim 4, wherein the controller is further operative to change either a velocity, an acceleration rate, or a deceleration rate between the first motion command and the second motion command.

6. The system of claim 1, wherein the controller is further operative to:
   control operation of the first mover with the first set of controller gains responsive to the first motion command; and
   control operation of the first mover with the second set of controller gains responsive to the second motion command.

7. The system of claim 6, further comprising a memory device in communication with the controller, the memory device configured to store the first and second sets of controller gains, wherein the controller is further operative to read the first and second set of controller gains from the memory device.

8. The system of claim 6, wherein the first motion command is a data packet, and wherein the data packet includes the first set of controller gains, the second set of controller gains, and the desired position of the first mover in response to the first motion command.

9. The system of claim 1, wherein:
   the track includes a plurality of track segments;
   each of the plurality of track segments includes a segment controller;
   the controller is the segment controller in one of the plurality of track segments; and
   the first mover is travelling along the corresponding track segment for the segment controller.

10. A method for controlling movers in a linear drive system, wherein the linear drive system includes a track and a plurality of movers operative to travel along the track, the method comprising the steps of:
    driving a first mover along the track with a controller responsive to a first motion command wherein the first motion command includes a desired location;
    detecting heavy traffic along the track with the controller as the first mover is travelling along the track, wherein the heavy traffic is detected when the first motion command is interrupted and the mover is commanded to stop at a position other than the desired location;
    responsive to detecting the heavy traffic:
       generating a second motion command for the first mover to resume travel to the desired location; and
       driving the first mover responsive to the second motion command.

11. The method of claim 10, wherein the step of detecting the heavy traffic further comprises the steps of:
    detecting when the first mover has stopped responsive to interrupting the first motion command;
    receiving a present location of the first mover from a position feedback system;
    comparing the present location of the first mover to the desired location of the first mover in response to the first motion command; and
    detecting the heavy traffic when the present location of the first mover is not the desired location of the first mover.

12. The method of claim 10, wherein the step of detecting the heavy traffic further comprises the steps of:
    detecting when the first mover is slowing responsive to interrupting the first motion command,
    receiving a present location of the first mover from a position feedback system;
    determining a projected stopping location for the first mover as a function of the present location, a velocity, and a deceleration rate of the first mover;
    comparing the projected stopping location of the first mover to the desired location of the first mover in response to the first motion command; and
    detecting the heavy traffic when the projected stopping location of the first mover is not the desired location of the first mover.

13. The method of claim 10, wherein the controller is further operative to change either a velocity, an acceleration rate, or a deceleration rate between the first motion command and the second motion command.

14. The method of claim 10, wherein the controller is further operative to:
- control operation of the first mover with a first set of controller gains responsive to the first motion command; and
- control operation of the first mover with a second set of controller gains responsive to the second motion command.

15. A system for controlling movers in a linear drive system, comprising:
- a track, wherein the track is divided into a plurality of blocks;
- at least a first mover and a second mover operative to travel along the track;
- a position feedback system configured to generate a first position feedback signal, corresponding to a present location of the first mover, and a second position feedback signal, corresponding to a present location of the second mover; and
- a controller operative to:
  - control operation of the first mover responsive to a first motion command, wherein the first motion command defines a desired position for the first mover upon completion of the first motion command;
  - sequentially assign at least one first block to the first mover between the present location and the desired position of the first mover responsive to the first motion command, each first block selected from the plurality of blocks;
  - identify at least one second block assigned to the second mover or reserved for movement between the first mover and the second mover, each second block selected from the plurality of blocks;
  - when the at least one first block to be assigned to the first mover is the same as the at least one second block, interrupt the first motion command and command the mover to stop at a position other than the desired position;
  - detect the heavy traffic when the first motion command is interrupted; and
  - control operation of the first mover responsive to a second motion command to resume travel to the desired position after detecting the heavy traffic.

16. The system of claim 15, wherein the controller is further operative to:
- detect a stopped position of the first mover after the first motion command is interrupted;
- compare the stopped position of the first mover to the desired position; and
- generate a second motion command when the stopped position is not the desired position.

17. The system of claim 16, wherein the controller is further operative to:
- control the first mover with a first set of controller gains responsive to the first motion command; and
- control the first mover with a second set of controller gains responsive to the second motion command.

18. The system of claim 16, wherein the controller is further operative to change either a velocity, an acceleration rate, or a deceleration rate between the first motion command and the second motion command.

19. The system of claim 16, wherein the controller is further operative to:
- control the first mover using a feedforward control path responsive to the first motion command; and
- disable the feedforward control path for the second motion command.

20. The system of claim 16, wherein:
- the linear drive system includes a plurality of coils spaced along a length of the track;
- the controller is further operative to:
  - sequentially active the plurality of coils to control operation of the first mover;
  - set a first maximum current value for each of the plurality of coils while controlling operation of the first mover responsive to the first motion command; and
  - set a second maximum current value for each of the plurality of coils while controlling operation of the first mover responsive to the second motion command.

* * * * *